United States Patent [19]

Rafanelli et al.

[11] Patent Number: 4,834,537
[45] Date of Patent: May 30, 1989

[54] POSITION ENCODING HOLOGRAPHIC SPECTROMETER

[75] Inventors: Gerard L. Rafanelli, Fountain Valley; Lacy G. Cook, El Segundo, both of Calif.

[73] Assignee: Hughes Aircraft Company, Los Angeles, Calif.

[21] Appl. No.: 136,681

[22] Filed: Dec. 22, 1987

[51] Int. Cl.[4] .............................................. G01B 9/02
[52] U.S. Cl. .................... 356/346; 356/353; 356/363
[58] Field of Search ........................ 356/346, 353, 363

[56] References Cited

PUBLICATIONS

Chakrabarti et al., "A New Inverted Shear Interferometer" *J. Opt.* (India), vol. 5, No. 4, pp. 80-87, 12/76.
Ballard, "Detecting Laser Illumination for Military Countermeasures", *Laser Focus*, pp. 72, 74, 76, 78, 80, 4/81.

*Primary Examiner*—Davis L. Willis
*Assistant Examiner*—Matthew W. Koren
*Attorney, Agent, or Firm*—William J. Streeter; A. W. Karambelas

[57] ABSTRACT

An interferometric spectrometer (20) for determining two-dimensional positional and spectral information of two-dimensional light sources (26) is disclosed. The spectrometer (20) includes a mechanism (28) for splitting a beam source (24) into two beam components (30) and (32). A mechanism (34) and (36) for focusing and centering the pair of beam components (30) and (32) is positioned in the line of projection of the beam components (30) and (32). A mechanism (38) and (40) for reflecting the pair of beam components (30) and (32) is positioned in the line of projection of the two beam components (30) and (32). A detector mechanism (42) for detecting the beam components (30) and (32) is positioned in the line of projection of the two beam components (30) and (32). A mechanism (44) for determining spatial and spectral information of the source (26) is associated with the detector mechanism (42). Also disclosed is a method of determining spatial and spectral information of a light source utilizing the spectrometer.

13 Claims, 1 Drawing Sheet

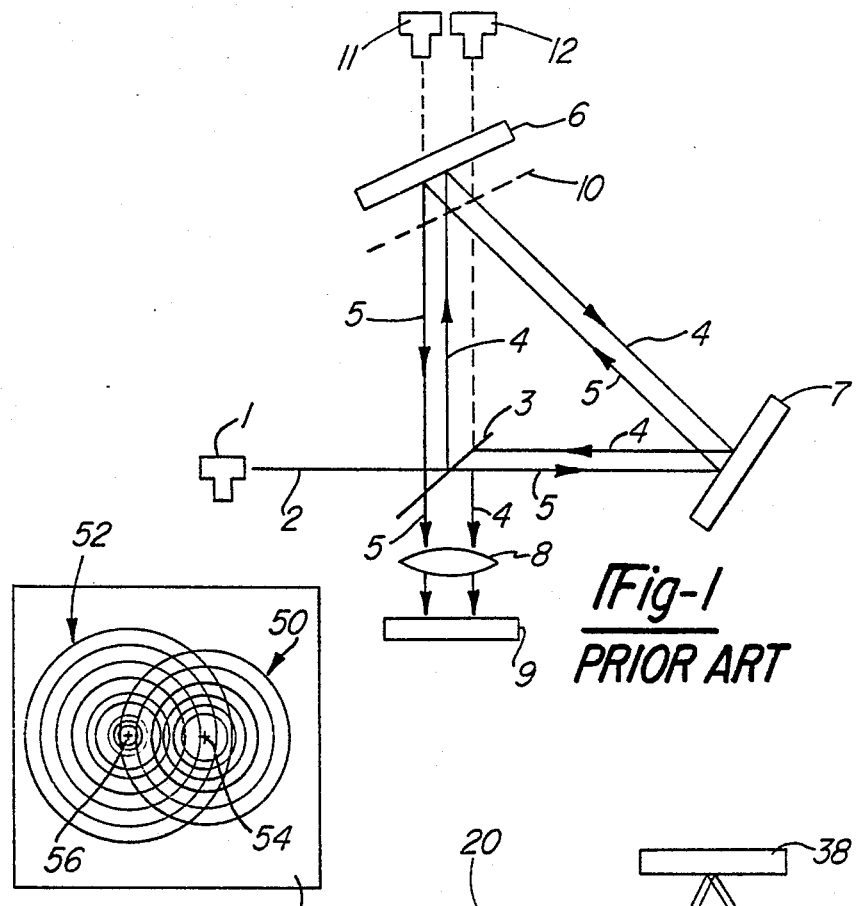
*Fig-1*
PRIOR ART
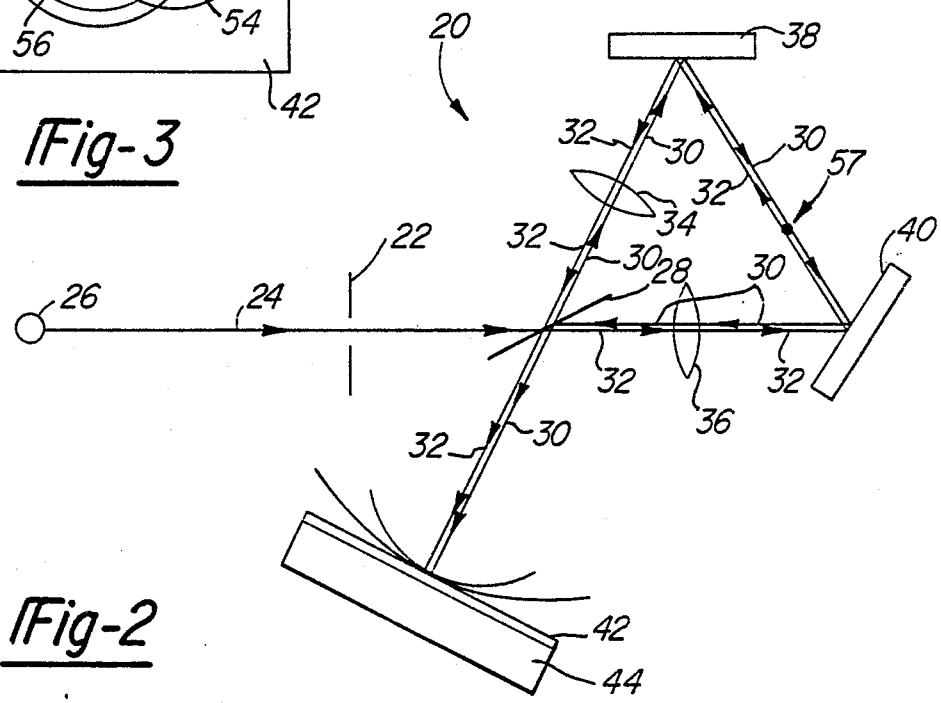
*Fig-3*
*Fig-2*

POSITION ENCODING HOLOGRAPHIC SPECTROMETER

BACKGROUND OF THE INVENTION

1. Field of the Invention

The present invention relates to spectrometers and more particularly, to holographic spectrometers enabling the simultaneous determination of spatial and spectral information of a light source.

2. Description of Related Art

Holographic spectrometers are well known in the art and are used to determined spectral information from radiant sources. These spectrometers determine the spectral content of the light contained in the source. Generally, a spectrometer that is used to determine spectral information from a light source is shown in FIG. 1. The spectrometer of FIG. 1 illustrates a light source (1) radiating a beam (2) which is projected into a beam splitter (3). The radiant beam (2) is split into two beam components (4) and (5). The beam components (4) and (5) are projected towards mirrors (6) and (7). The beams (4) and (5) are reflected from one mirror to the other mirror, as shown by the arrows in the drawing, and are directed back towards the beam splitter (3). The beam splitter (3) projects the reflected beam components (4) and (5) through a lens (8) which, in turn, projects the beams onto an interference plane (9). As can be seen in the figure, mirror (6) is positioned a desired distance behind the symetrical mirror position indicated by dash line (10) and virtual sources (11) and (12) are formed behind the mirror (6). This positioning enables the two beam components (4) and (5) to interfere with one another, causing an interference pattern, directed by the lens (8), to be projected onto the interference plane (9) for determining spectral information of the source by the application of fourier transform techniques to the measured interference pattern of the two beam components. As the beam components are projected onto the interference plane, all spatial information about the source is lost. Only spectral information can be determined from the interference plane. This type of spectrometer only measures the spectral content of polychromatic extended scenes. Therefore, this art has the disadvantage that it can only determine spectral information.

Dispersive spectrometer may be used with a position encoding device to determine two-dimensional spatial positioning of a light source. However, since dispersive spectrometers only accept line fields of view, position encoding with a dispersive spectrometer requires complex fiber optic reformatting to accomplish the simultaneous determination of the two-dimensional spatial position and spectral content of the light source. The use of fiber optics with the dispersive spectrometer is not only complex but is very expensive.

SUMMARY OF THE INVENTION

Accordingly, it is an object of the present invention to overcome the disadvantages of the above art. The present invention provides the art with a spectrometer having the capability to simultaneously measure high resolution spectral information and positional information for a wide field of view while having large optical throughput. The present invention also provides the art with a spectrometer having improved optical throughput and field of view. Further, the present invention enables simultaneous measuring of spectral and positional information for a wide two-dimensional field of view with large optical throughput by untilizing conventional optical elements.

The new and improved spectrometer of the present invention includes a mechanism for splitting a source beam entering into the spectrometer into two beam components. A mechanism for focusing and centering the two beam components is positioned in the line of projection of the two beam components. A mechanism for reflecting the beam components is positioned in the line of projection of the beam components. A detector mechanism for detecting the beam components is positioned in the line of projection of the two beam components. A mechanism for determining spatial and spectral information of the beam source is associated with the detector mechanism.

Also disclosed, is a method of determining the spatial and spectral information of a light source utilizing the above described spectrometer. The method includes; passing the beam from the source into the spectrometer; splitting the beam into a pair of beam components; directing the pair of beam components through the mechanism for centering and focusing the beam components; directing the focused pair of beam components to the reflecting mechanism; reflecting the two beam components from the reflecting mechanism to the detector mechanism; transmitting information from the detector mechanism to the mechanism for determining spatial and spectral information; and determining the spectral and spatial information of the light source.

From the following specification taken in view of the claims and accompanying drawings, other objects and advantages of the present invention will become apparent to one skilled in the art.

BRIEF DESCRIPTION OF THE DRAWINGS

In the accompanying drawings:

FIG. 1 is a schematic view of a prior art spectrometer.

FIG. 2 is a schematic view of a spectrometer in accordance with the present invention.

FIG. 3 is a view of a pattern projected to the detector plane.

DETAILED DESCRIPTION OF THE PREFERRED EMBODIMENT

Turning to FIG. 2, a schematic of a spectrometer is shown and designated with reference numeral (20). The spectrometer generally includes a two-dimensional aperture stop (22) for enabling beam (24) from light source (26) to enter into the spectrometer (20). The spectrometer (20) further includes a mechanism (28) for splitting the beams into two components (30) and (32). Mechanisms (34) and (36), for centering and focusing the two beam components (30) and (32), are positioned in the line of projection of the beam components (30) and (32). Mechanisms (38) and (40), for reflecting the two beam components (30) and (32), are positioned in the line of projection of the two beam components (30) and (32). A detector mechanism (42) is positioned in the line of projection of the two beam components (30) and (32). A mechanism (44) for determining spatial and spectral information of the light source (26) is associated with the detector mechanism (42).

Generally, the mechanism (28) for splitting the beam (24) into its two components (30) and (32) is a conventional beam splitter. The splitter is positioned at a desired distance from the aperture stop (22) in the spectrometer (20). The beam splitter is tilted and centered with respect to the beam (24) at a desired angle for projecting the beam components (30) and (32) along their desired path.

Centering and focusing mechanisms (34) and (36) are generally either two positive lenses, or one positive lens and one negative lens. The spectrometer configuration displayed in FIG. 2 uses two positive lenses. Each lens (34) and (36) is positioned in the line of projection of one of the beam components (30) and (32). The lenses (34) and (36) are positioned such that they receive the beam components (30) and (32) and project the beam components (30) and (32) onto the reflecting mechanisms (38) and (40). The lenses (34) and (36) are positioned with respect to the beam splitter (28) such that they are at a desired orientation for excepting the beams coming from the beam splitter (28) and passing the beams back to the beam splitter (28). As will be described herein, the combined afocal characteristics of the lenses (34) and (36) enables the beam components (30) and (32) to pass through the lenses (34) and (36) in one direction, having certain wavefront information characteristics, and then return through the lenses in the opposite directions having different wavefront information characteristics. Thus, the lenses (34) and (36) are positioned such that their focal points coincide at a point (57) between the reflecting mechanisms (38) and (40). In addition the lenses (34) and (36) are separated by a path length equal to the sum of their focal lengths. The detector plane (42) is a distance from the lens (36) equal to the focal length of lens (36), and the detector plane also is a distance from the lens (34) equal to the focal length of lens (34). The actual beam paths traversed by beam component (30) and (32) are coincident, they are displaced slightly in FIG. 2 for ease of understanding.

Reflecting mechanisms (38) and (40) are generally planar mirrors. The mirrors (38) and (40) are tilted and centered with respect to the line of projection of the beam components (30) and (32). Also the mirrors (38) and (40) are positioned such that the beam components (30) and (32) are reflected from one mirror to the other and back through the lens (34) or (36) which the beam components (30) and (32) did not originally pass through.

The detector mechanism (42) is generally a two-dimensional detector array, as best seen in FIG. 3. The detector array (42) is positioned at a desired distance from the beam splitter (28) and in the line of projection of the beam components (30) and (32). The detector (42) is tilted and centered with respect to the line of projection of the beam components (30) and (32). As can been seen in FIG. 3, the beam components (30) and (32) project concentric interference ring patterns (50) and (52) onto the detector array (42). The concentric ring patterns (50) and (52) have centers (54) and (56) and a plurality of rings surrounding the centers (54) and (56). The positioning of the centers (54) and (56) enables the mechanism (44) for determining spatial and spectral information to determine the positions of light sources (26). Also, from the number and amplitude of the individual rings in the concentric ring patterns (50) and (52) the spectral information of the light sources can be determined.

The mechanism (44) for determining the spatial and spectral information of the beam source is associated with the detector array (42). The mechanism (44) being a conventional microprocessor, interprets information from the detector array (42) and determine the positions and spectra of the light sources (26). Generally, the intensity for a non-monochromatic point source is given by the following equation:

$$I(X,Y) = \int_0^\infty d\sigma \{|U_1(\sigma)|^2 + |U_2(\sigma)|^2 + 2|U_1(\sigma)||U_2(\sigma)|\cos(\sigma K r^2 + \psi)\}$$

Thus, the spectrum is encoded spatialy in the detector plane by the $\cos(Kr^2)$ transform.

For N incoherent point sources at $(x_i, y_i) i=1\ldots, N$, in the intensity at the the detector plane (42) is given by the following equation:

$$I(X,Y) = \sum_{i=1}^{N} \int_0^\infty d\sigma \{|U_{1i}(\sigma)|^2 + |U_{2i}(\sigma)|^2 + 2|U_{1i}(\sigma)||U_{2i}(\sigma)|\cos(\sigma K r^2 + \psi)$$

Where
$\sigma$—is the inverse wavelength
$U_1$—is the field amplitude after traversing path 1
$U_2$—is the filed amplitude after traversing path 2
$r - \Omega = \sqrt{x^2+y^2}$; is the radial position in the dector plane
$\Psi$—is an arbitrary phase constant
K—is a constant related to the focal lengths of lenses (34) and (36)
Path 1—refers to the path traversed by beam component (30)
Path 2—refers to the path traversed by beam component (32)

Thus, for qausi-monochromatic point sources, the focal plane intensity pattern is exemplified by Fresnel rings center about each source image. For a non-monochromatic point source the centroid of the Fresnel pattern yields position, while the spatial frequencies of the diffraction rings yield the transform of the spectrum. Thus, by utilizing the above equation, mechanism (44) can determine the position and spectral information of the light source (26).

The above described spectrometer generally functions in the following manner. The sources (26) project beam (24) from the sources (26). The beams are intercepted by the spectrometer (20) and pass through the aperture stop (22). Beams (24) are passed into the beam splitter (28) of the spectrometer (20). The beam splitter (28) splits the source beams (24) into two beam components (30) and (32). Beam component (30) is projected through lens (34) and transmitted to the mirror (38). The mirror (38) reflects beam (30) into mirror (40). The mirror (40) reflects beam component (30) through lens (36) in the opposite direction of beam component (32). Beam component (30) is projected from lens (36) and transmitted to the beam splitter (28). The beam splitter (28) projects beam component (30) into the detector array (42). Simultaneously while beam component (30) is being projected through the system so is beam component (32). Beam component (32) is projected from the beam splitter (28) through lens (36). Lens (36) transmitts beam component (32) to the mirror (40). The mirror (40) reflects beam component (32) into the mirror (38). The mirror (38) reflects beam component (32) through lens (34) which, in turn, transmitt beam component (32) to beam splitter (28). The beam splitter (28) projects beam component (32) towards the detector array (42). The detector array (42) measures the spatial intensity distribtion formed by the interference between the two beams (30) and (32). The measured intensity information is transmitted from the detector array (42) to the mechanism (44) for determining the spectra and locations of the point sources (26). The mechanism (44) by using the measured interference pattern of the beams, and the above equation, determines the position and spectra of point sources (26).

The afocal lenses (34) and (36) are positioned such that their focal points coincide at a point (57) between the reflecting mechanisms (38) and (40). The lenses (34) and (36) are separated by a path length equal to the sum of their focal lengths. The locations of lenses (34) and (36) relative to the detector plane (42) are such that the path length from lens (34) to the detector plane is equal to the focal length of lens (34), and the path length from lens (36) to the detector plane (42) is equal to the focal length of lens (36). The beam components are directed through the lenses (34) and (36) to the mirrors (38) and (40) and then re-directed back through the other lens (34) or (36) to produce an interference pattern at the detector array (42) as described above.

The present invention may be utilized for enabling the determination of simultaneous spectral and positional information from re-entry vehicles. Also the present invention may be utilized to simultaneous determine spectral and positional information from laser beam sources.

While the above describes the preferred embodiment of the present invention, it should be understood that the present invention is susceptible to modification, variation, and alteration without varying from the scope and fair meaning of the subjoined claims.

What is claimed is:

1. A spectrometer comprising:
    means (28) for splitting beams (24) from sources (26) into two components (30) and (32):
    means for focusing and centering said beam components (30) and (32), said focusing and centering means including an afocal lens system for transmitting and centering said beam components (30) and (32) and positioned in the line of projection of said beam components (30) and (32);
    means for reflecting said beam components (30) and (32), said reflecting means positioned in the line of projection of said beam components (30) and (32);
    means (42) for detecting said two beam components (30) and (32), said detector means (42) positioned in the line of projection of said beam components (30) and (32);
    means (44) for determining spatial and spectral information of said source (26) said determining means associated with said detector means (42).

2. The spectrometer according to claim 1 wherein said afocal lens system comprised of lenses (34) and (36) centered with respect to the respective beam components (30) and (32), each of said lenses (34) and (36) transmitting and centering one of said beam components (30) and (32).

3. The spectrometer according to claim 2 wherein said reflecting means includes a pair of mirrors (38) and (40) centered with respect to the beam components (30) and (32) in the line of projection of said lenses (34) and (36).

4. The spectrometer according to claim 3 wherein said beam components (30) and (32) reflect from said pair of mirrors (38) and (40) such that the beam components travel through the other respective lenses (34) and (36) in an opposite direction with respect to the direction of travel of the first beam components (30) and (32) to pass through the lenses (34) and (36).

5. The spectrometer according to claim 4 wherein said reflected beam components (30) and (32) pass through said splitting means (28) and are projected to said detector means (42).

6. The spectrometer according to claim 5 wherein said reflected beam components (30) and (32) interfere and produce an interference pattern on said detector means (42), said interference pattern contains both spectral and spatial information of the sources (26).

7. The spectrometer according to claim 6 wherein said means (44) for determining spatial and spectral information from the measured the intensity pattern through the following equation:

$$I(X,Y) = \sum_{i=1}^{N} \int_{0}^{\infty} d\sigma \, \{|U_{1i}(\sigma)|^2 + |U_{2i}(\sigma)|^2 +$$

$$2|U_{1i}(\sigma)||U_{2i}(\sigma)|\cos(\sigma K r_i^2 + \psi)\}$$

Wherein

I —is the intensity in the detector plane (42)

$\left.\begin{array}{c}x\\y\end{array}\right\}$ are the positional coordinates in the plane of the detector means (42)

$\sigma$—is the inverse wavelength
$U_{1i}$—is the field amplitude due to point source after traversing path 1
$U_{2i}$—is the field amplitude due to point source after traversing path 2
K—is a constant related to the focal lengths of lenses (34) and (36)
$r_i$—is the radial distance measured from the center of the $i^{th}$ point sources image, $$\Omega_i = V\sqrt{(X - X_i)^2 + (Y - Y_i)^2}$$

—is an arbitrary phase constant
Path 1—Refers to the path traversed by beam component (30)
Path 2—Refers to the path traversed by beam component (32)
$X_i, Y_i$—are the positional coordinates of the $i^{th}$ point source in the plane of the detector means (42)

8. Method of determining simultaneous spatial and spectral information of a two-dimensional light source with a spectrometer having means for splitting a beam from the light source, means for centering and focusing beams including an afocal lens system, means for reflecting the beams, means for detecting beams, and means for determining spatial and spectral information of the source; the method comprising:
    passing a beam (24) from a source (26) into said spectrometer (20),
    splitting said beam (24) into a pair of beam components (30) and (32) having a wave length,
    directing said pair of beam components (30) and (32) through said afocal lens system (34) and (36) for centering and focusing said beam components (30) and (32), directing said focused beam components (30) and (32) to said reflecting means (38) and (40), reflecting said reflected beam components (30) and (32) to said detector means (42), transmitting information from said detector means (42) to said means (44) for determining spatial and spectral information, determining the spectral and spatial information of said source.

9. The method according to claim 8 further comprising redirecting said reflected beam components (30) and (32) through said means (34) and (36) for centering and focusing.

10. The method according to claim 9 further comprising redirecting said twice centered and focused beam components (30) and (32) through said splitting means (28).

11. The method according to claim 10 further comprising redirecting said split beam components (30) and (32) into said detector means (42).

12. The method according to claim 11 further comprising determining the spatial and spectral information of the source from the intensity of said split beam components (30) and (32).

13. The method according to claim 12 further comprising determining said intensity by the following equation:

$$I(X,Y) = \sum_{i=1}^{N} \int_0^\infty d\sigma \{|U_{1i}(\sigma)|^2 + |U_{2i}(\sigma)|^2 + 2|U_{1i}(\sigma)||U_{2i}(\sigma)|\cos(\sigma K r_i^2 + \psi)\}$$

Wherein

I—is the intensity in the detector means (42)

$\left. \begin{array}{c} x \\ y \end{array} \right\}$ are the positional coordinates in the plane of the detector means (42)

$\sigma$—is the inverse wavelength $U_{1i}$—is the field amplitude due to point source after traversing path 1

$U_{2i}$—is the field amplitude due to point source after traversing path 2

K—is a constant related to the focal lengths of the afocal lens system (34) and (36)

$r_i$—is the radial distance measured from the center of the $i^{th}$ point sources image, $$\Omega_i = V\sqrt{(X - X_i)^2 + (Y - Y_i)^2}$$

$\Psi$—is an arbitrary phase constant

Path 1—Refers to the path traversed by beam component (30)

Path 2—Refers to the path traversed by beam component (32)

$X_i, Y_i$—are the positional coordinates of the $i^{th}$ point source in the plane of the detector means (42)

* * * * *